(12) United States Patent
Cenko

(10) Patent No.: US 9,375,801 B2
(45) Date of Patent: Jun. 28, 2016

(54) ROTARY WELDING TORCH

(76) Inventor: Arben Cenko, Windsor (CA)

(*) Notice: Subject to any disclaimer, the term of this patent is extended or adjusted under 35 U.S.C. 154(b) by 378 days.

(21) Appl. No.: 13/125,719

(22) PCT Filed: Oct. 23, 2009

(86) PCT No.: PCT/IB2009/007377
§ 371 (c)(1),
(2), (4) Date: Apr. 22, 2011

(87) PCT Pub. No.: WO2010/046776
PCT Pub. Date: Apr. 29, 2010

(65) Prior Publication Data
US 2011/0198332 A1 Aug. 18, 2011

Related U.S. Application Data

(60) Provisional application No. 61/107,816, filed on Oct. 23, 2008, provisional application No. 61/111,409, filed on Nov. 5, 2008.

(51) Int. Cl.
*B23K 9/00* (2006.01)
*B23K 9/28* (2006.01)

(52) U.S. Cl.
CPC ............... *B23K 9/285* (2013.01); *B23K 9/287* (2013.01)

(58) Field of Classification Search
CPC ........... B23K 9/285; B23K 9/287; B23K 9/28
USPC .............. 219/137.31, 137.61, 137.62, 137.63
See application file for complete search history.

(56) References Cited

U.S. PATENT DOCUMENTS

| | | | | |
|---|---|---|---|---|
| 3,754,114 A | * | 8/1973 | Peyrot | 219/60.2 |
| 4,072,828 A | * | 2/1978 | Thome | 219/137.31 |
| 4,142,084 A | * | 2/1979 | Torrani | 219/60 A |
| 4,467,175 A | * | 8/1984 | Reeh et al. | 219/137.31 |
| 4,533,816 A | * | 8/1985 | Reeh et al. | 219/137.31 |
| 4,549,068 A | * | 10/1985 | Kensrue | 219/137.63 |
| 4,803,328 A | * | 2/1989 | Obara | 219/69.12 |
| 4,864,099 A | * | 9/1989 | Cusick et al. | 219/137.62 |
| 4,975,554 A | * | 12/1990 | Tedder | 219/60 A |
| 7,084,373 B2 | * | 8/2006 | Sugahara et al. | 219/137.43 |
| 7,484,916 B1 | * | 2/2009 | Tanis | 409/233 |
| 2006/0049159 A1 | * | 3/2006 | Nihei et al. | 219/137.9 |
| 2007/0012672 A1 | * | 1/2007 | Inoue et al. | 219/137.9 |

* cited by examiner

*Primary Examiner* — Dana Ross
*Assistant Examiner* — James Sims, III
(74) *Attorney, Agent, or Firm* — Warner Norcross & Judd LLP

(57) ABSTRACT

A rotary robotic welding torch that enables the welding process in a robotic unit. The rotary welding torch allows for clockwise and counterclockwise rotation during the welding process, while being supplied with an uninterrupted supply of inert gas and electrical current. The rotary robotic welding torch may also be supplied with an uninterrupted supply of coolant and/or electrode/filler wire during the welding process.

3 Claims, 21 Drawing Sheets

ROTARY WELDING TORCH

CROSS-REFERENCE TO RELATED APPLICATIONS

The present application claims priority under 35 USC §119 on the Patent Cooperation Treaty application PCT/IB2009/007377, filed on Oct. 23, 2009, which claims priority off of U.S. Provisional Patent Application No. 61/107,816, filed on Oct. 23, 2008, and U.S. Provisional Patent Application No. 61/111,409, filed on Nov. 5, 2008, the disclosures of which are incorporated by reference.

FIELD

The present disclosure generally relates to welding torches for robotic units. More particularly, the present disclosure relates to a welding torch for a robotic unit which allows rotation of the torch in the clockwise or counterclockwise direction.

BACKGROUND

Welding torches are often used in conjunction with a robotic unit. This is particularly advantageous in a manufacturing setting where multiple welds are needed in a precise fashion. Two types of welding torches often used with robotic units are metal inert gas ("MIG") welding torches and tungsten inert gas ("TIG") welding torches. When used with a robotic unit, the welding torch may be fastened to the robotic unit, at a robotic interface and supplied with electrical current, electrode wire, a supply of inert gas, and a supply of coolant. Such materials are typically provided to the welding torch via one or more cable assemblies.

Metal inert gas ("MIG") welding torches may be used in a variety of applications. MIG welding torches are used primarily in industrial welding applications due to the need to protect the welding area from atmospheric oxygen and/or nitrogen. During the MIG welding process, an electrode wire is supplied to the tip of the welding apparatus. An electrical arc is then provided which acts to heat and melt the electrode wire causing the electrode wire to be applied on the workpiece. Based on the reactivity of the molten electrode wire with oxygen and/or nitrogen in the atmosphere, a stream of inert gas, such as helium or argon, is directed over the molten electrode wire to prevent oxygen and/or nitrogen from contacting the molten electrode wire and adversely affecting the integrity of the weld.

Tungsten inert gas ("TIG") welding torches may be used in a variety of applications. TIG welding torches are used primarily in welding applications involving thin work pieces such as piping. TIG welding is also used in the aerospace industry due to the ability to weld thin workpieces and the ability to weld materials such as aluminum TIG welding utilizes a non-consumable tungsten electrode. Tungsten is selected as the electrode material of choice based on it high melting point. During the TIG welding process, an electrical arc is struck between the tungsten electrode and the work piece. The electrical arc may cause the work piece to melt thereby creating a weld pool. A filler wire may be supplied to an area proximate to the tungsten electrode whereby the electrical arc acts to heat and melt the filler wire causing the melted filler wire to be applied on the workpiece. Based on the reactivity of the molten filler wire or the molten workpiece with oxygen and/or nitrogen in the atmosphere, a stream of inert gas, such as helium or argon, is directed over the weld pool to prevent oxygen and/or nitrogen from contaminating the weld pool and adversely affecting the integrity of the weld.

Current designs of such robotic torches in the industry are installed in a fixed position throughout an arm/or thru arm, to the robotic interface and during the welding process the robot must twist the cables in order to turn the robotic torch around. This becomes a problem, as the cables (whether fixed or rotary), are subjected to severe mechanical wear during articulation of the robotic arm. This mechanical wear can result in coolant leak and voltage variation which may adversely affect the welding process and the quality of the final weld. As such there is a need in the art for a robotic welding torch which provides for rotation without damaging one or more of the supply cables connected to the robotic welding torch.

SUMMARY OF THE DISCLOSURE

Figure 1:
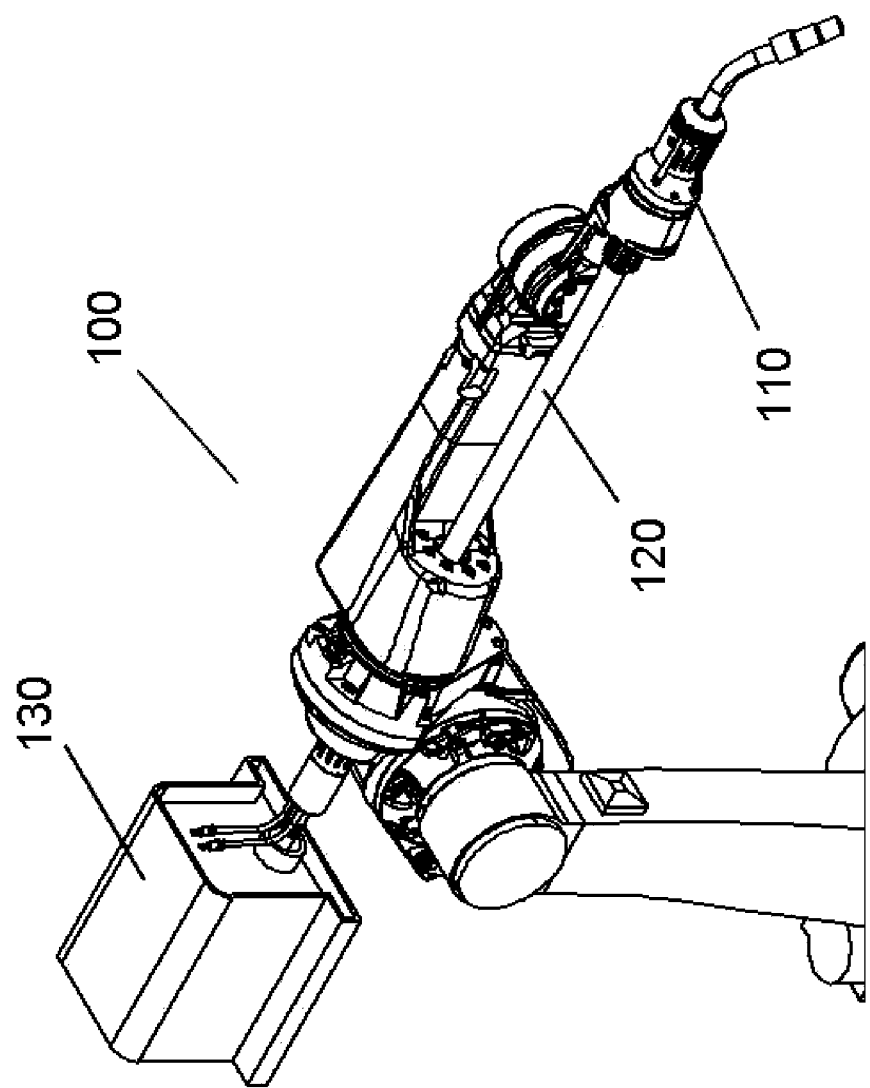
FIG. 1, is a depiction of a MIG rotary welding torch assembly in accordance with the present disclosure.

Disclosed herein, is a rotary welding torch comprising a supply conduit providing a supply of inert gas, coolant and electrical current and a rotary welding assembly. The rotary welding assembly comprises a first portion receiving the supply of inert gas, coolant, and electrical current from the supply conduit and a second portion rotatably attached to the first portion. The second portion of the rotary welding assembly receives the supply of inert gas, coolant, and electrical current from the first portion wherein the second portion of the rotary welding assembly is rotatable with respect to the first portion of the rotary welding assembly while receiving the supply of inert gas, coolant, and electrical current from the first portion of the rotary welding assembly. The second portion of the rotary welding torch may rotate clockwise and counter clockwise with respect to the first portion of the rotary welding torch. The second portion of the rotary welding torch may also rotate endlessly with respect to the first portion of the rotary welding torch.

The supply conduit may provide a supply of electrode wire to the first portion of the rotary welding assembly. When supplied with electrode wire from the supply conduit, the second portion of the rotary welding assembly may receive the supply of electrode wire from the first portion of the rotary welding assembly wherein the second portion of the rotary welding assembly is rotatable with respect to the first portion of the rotary welding assembly while receiving said supply of electrode wire from said first portion of the rotary welding assembly.

The rotation of the second portion of the rotary welding assembly with respect to the first portion of the welding assembly may be provided by a rotary coolant assembly. The rotary coolant assembly may comprises a plurality of intersecting channels which form passageways allowing the coolant to travel through the rotary coolant assembly while providing for rotation of the second portion of said rotary welding assembly with respect to the first portion of said welding assembly. The rotary coolant assembly may comprise a centrally located passageway along the central axis of the rotary welding assembly, wherein inert gas is supplied through the centrally located passageway of the rotary coolant assembly for use during the welding process. Electrode wire may also be supplied through the centrally located passageway of the rotary coolant assembly for use during the welding process when supplied via the supply conduit. The rotary coolant assembly may include a contact assembly which supplies current from the first portion of the rotary welding assembly to the second portion of the welding assembly.

The rotary welding torch may further comprise one or more wire guide assemblies which provide a supply of electrode wire to the consumable suite. The one or more wire guide assemblies may each comprise a wire guide support and a tool center point adjusting suite.

DETAILED DESCRIPTION OF THE PREFERRED EMBODIMENTS OF THE DISCLOSURE

In accordance with the present disclosure there is provided a welding torch for use with a robotic unit. The robotic welding torch may be a metal inert gas ("MIG") welding torch or a tungsten inert gas ("TIG") welding torch. The robotic welding torch provides for clockwise and/or counterclockwise rotation during the welding process while being continually supplied with one or more selected from inert gas, electrical current, and filler/electrode wire. Additionally the robotic welding torch may be water cooled and/or air cooled whereby the water and/or air is provided to the welding torch while still providing for rotation of the robotic welding torch. Other cooling fluids may also be used as required. The robotic welding torch may be provided with uninterrupted cooling and electrical current transfer during rotation. The robotic welding torch may be a replaceable component that mounts to the front mounting flange of a welding robot. The robotic welding torch may be assembled at the front mounting interface of the robotic welder and then connected to the power source through a supply conduit assembly.

The rotary welding torch generally comprises a rotary welding assembly, a supply conduit, an inert gas source and a power source. The rotary welding torch may additionally comprise a source of electrode/filler wire. When utilizing a coolant, the welding torch will also require a coolant source for providing cooling fluid, such as water or air, to the rotary welding assembly.

The supply conduit supplies one or more selected from inert gas, coolant and an electrical current from the welding assembly to the rotary welding assembly. The welding assembly may be a general welding apparatus or a robot assembly. The supply conduit may also supply the electrode wire to the rotary welding assembly. The supply conduit may be affixed with a cable attachment to the rotary welding assembly and the welding assembly. The supply conduit may be comprised of a rigid or flexible hose based on the type of application and desired use. The supply conduit may maintain a fixed position during the rotation of the welding torch.

The supply conduit may comprise one or more passageways for supplying one or more selected from electrode wire, inert gas, and coolant from the welding assembly to the rotary welding assembly. The electrode wire and inert gas may be provided through separate or combined passageways through the supply conduit. The coolant may circulate through the rotary welding assembly and is typically supplied to and received from the rotary welding assembly through a coolant passageway. The electrical current may be supplied from the welding assembly to the rotary welding assembly through the supply conduit via one or more conductive elements such as a conductive wire, conductive strip or conductive component.

The rotary welding assembly comprises a rotary coolant assembly, a conductive tube assembly, and a consumable suite. The rotary coolant assembly is designed to receive one or more selected from inert gas, coolant, electrical current and electrode wire from the supply conduit and supply the received materials and electrical current to the conductive tube assembly while providing for clockwise or counterclockwise rotation of the rotary welding assembly. The conductive tube assembly receives one or more selected from inert gas, coolant, electrical current, and electrode wire from the rotary coolant assembly and transfers the supplied materials and electrical current to the consumable suite for use in the welding process.

The rotary coolant assembly may include a plurality of passageways allowing for the passage of one or more selected from coolant, electrode wire, and inert gas through the rotary coolant assembly while providing for rotation of the rotary welding assembly. The rotary coolant assembly may include a plurality of intersecting channels which form passageways allowing the coolant to travel through the rotary coolant assembly to the conductive tube assembly during rotation of the rotary coolant assembly. The plurality of intersecting channels may together form a flow path which allows the coolant to continuously flow through the rotary welding assembly during use. The rotary coolant assembly may also include a centrally located passageway along the central axis of the rotary coolant tool. The centrally located passageway allows for the electrode wire and/or inert gas to be supplied through the rotary coolant assembly to the conductive tube assembly and to the consumable suite for use during the welding process.

Transfer of the electrical current through the rotary coolant assembly is provided via a contact assembly and one or more conductive elements in the rotary coolant assembly. The electrical current is then transferred to the contact assembly via one or more conductive elements such as a conductive wire, conductive strip or conductive component. The electrical current is then supplied from the contact assembly to the conductive tube assembly via one or more conductive elements such as a conductive wire, conductive strip or conductive component.

The conductive tube assembly connects the rotary coolant assembly to the consumable suite of the rotary welding torch. The conductive tube assembly may be comprised of the conductive tube and chiller components. The coolant, inert gas, and electrode wire (where applicable) may be supplied through the conductive tube to the chiller and consumable suite via two or more passages in the conductive tube. The coolant enters the coolant tube assembly from the rotary coolant assembly through a coolant inlet, circulates through the conductive tube assembly thereby making thermal contact with the chiller, and exits the conductive tube assembly via a coolant outlet and enters the rotary coolant assembly. The inert gas and/or the electrode wire may be supplied to the consumable suite through the conductive tube assembly in single passageway or separate passageways extending from the rotary coolant assembly. In a preferred embodiment of the present disclosure, the inert gas and the electrode wire may be supplied to the consumable suite via a single passageway from the rotary coolant assembly through the conductive tube.

In a first embodiment of the present disclosure there is provided a MIG robotic welding torch. The MIG robotic welding torch comprises a rotary welding assembly, a supply conduit, a source of electrode wire, a coolant source, an inert gas source and a power source. The MIG robotic welding torch provides for endless rotation in the clockwise or counterclockwise direction during use. A depiction of a MIG welding torch 100 in accordance with the present disclosure is depicted in FIG. 1. The MIG welding torch generally comprises a rotary welding assembly 110, a supply conduit 120, an inert gas source and a power source. The rotary welding torch may additionally comprise a source of electrode/filler wire 130. The MIG welding torch will also require a coolant source for providing cooling fluid, such as water or air, to the rotary welding assembly 110.

Figure 2:
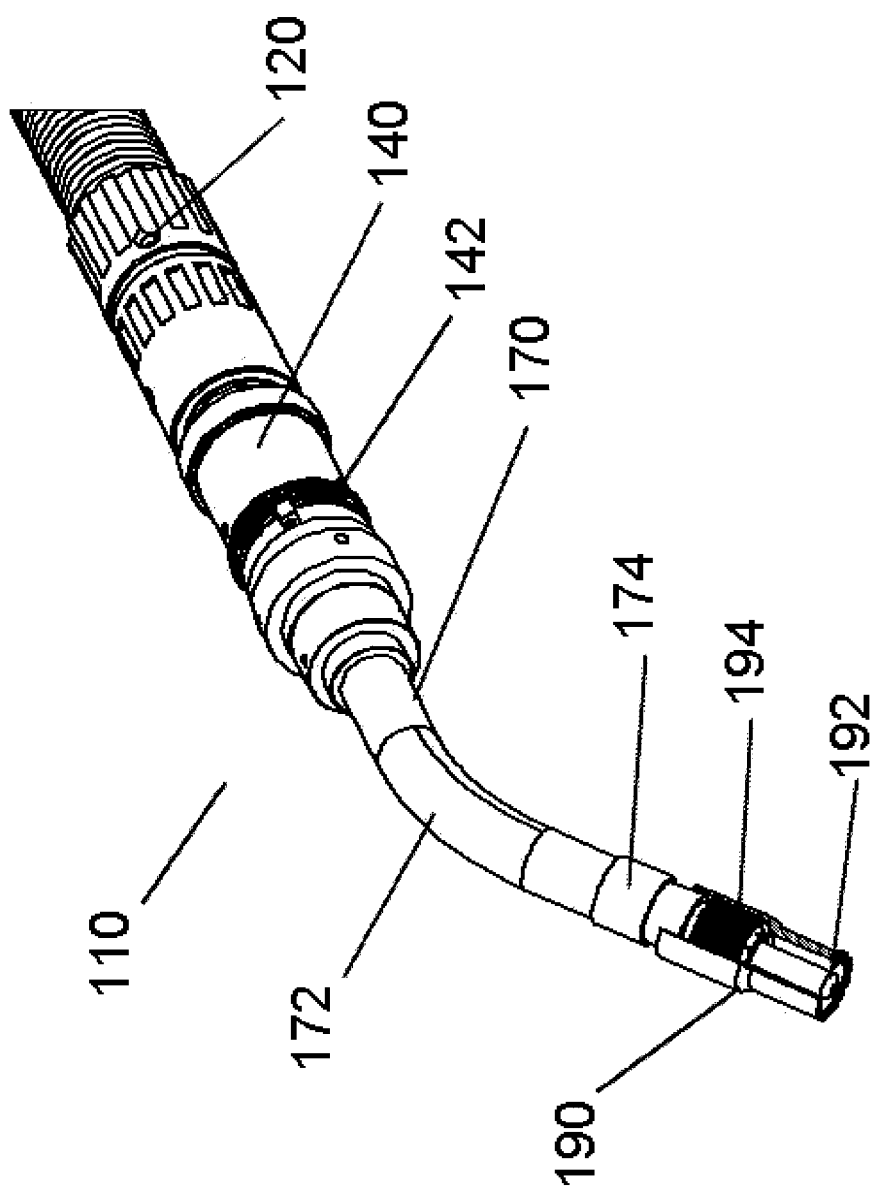
FIG. 2, is a depiction of rotary welding assembly of a MIG rotary welding torch in accordance with the present disclosure.

The rotary welding assembly 110 comprises a rotary coolant assembly 140, a conductive tube assembly 170, and a consumable suite 190 as depicted in FIG. 2. The rotary coolant assembly 140 is designed to receive electrode wire, inert gas, coolant and an electrical current from the supply conduit 120 and supply the electrode wire, inert gas, coolant and electrical current to the conductive tube assembly 170 while providing for continuous rotation of the rotary welding assembly 110. The conductive tube assembly 170 receives the electrode wire, inert gas, coolant and an electrical current from the rotary coolant assembly 140 and transfers the electrode wire, inert gas, coolant and an electrical current to the consumable suite 190 for use in the welding process. The rotary welding assembly 110 may further comprise a welding a front lock cap and a protective housing. The protective housing may be disposed around the rotary coolant assembly. The front lock cap may be threadably coupled to the front portion of the protective housing which aids in securing the conductive tube assembly to the rotary coolant assembly.

Figure 3:
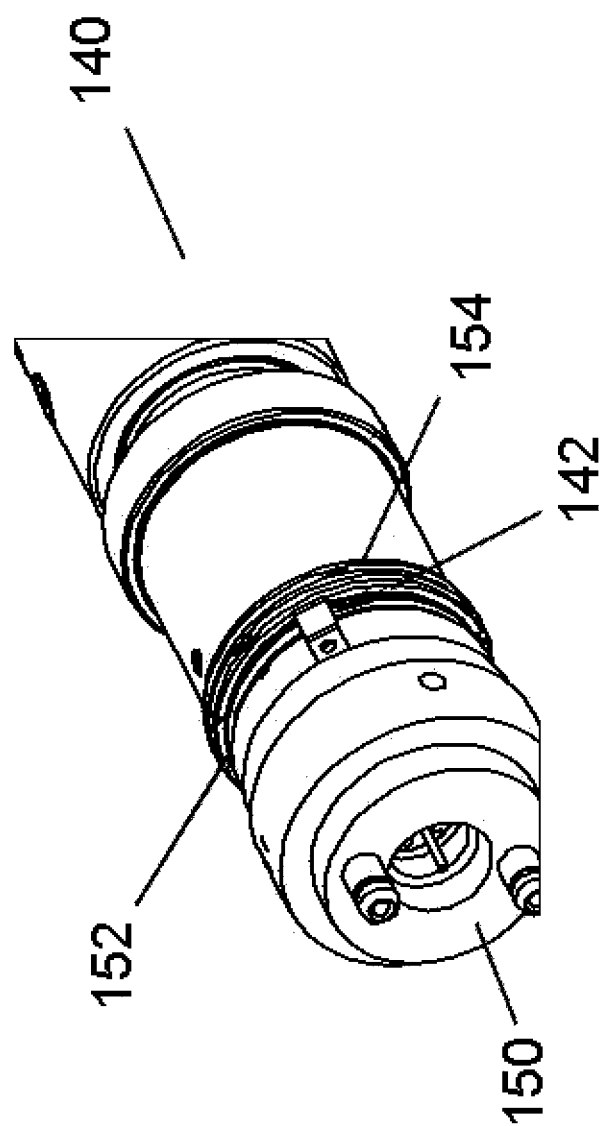
FIG. 3 is a depiction of a rotary coolant assembly of a MIG rotary welding torch in accordance with the present disclosure.
Figure 4:
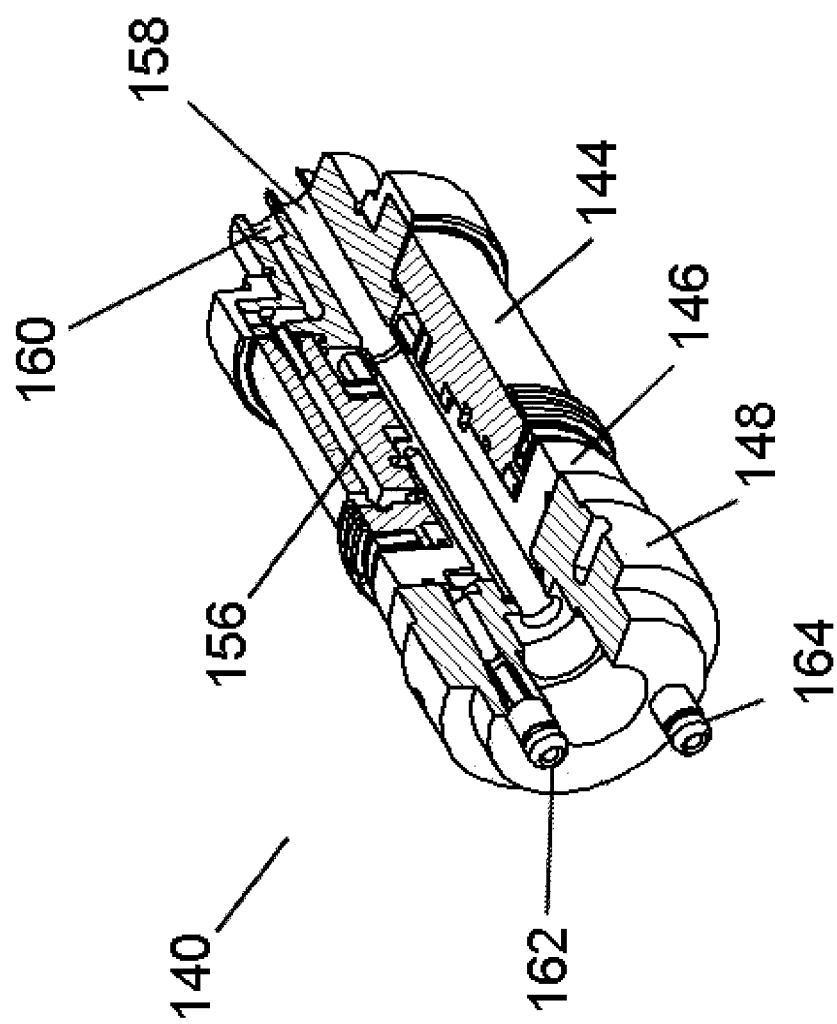
FIG. 4 is a depiction showing a cut-away view of a rotary coolant assembly of a MIG rotary welding torch in accordance with the present disclosure.

Shown in FIGS. 3 and 4 is a depiction of a rotary coolant assembly in accordance with the present disclosure. The rotary coolant assembly 140 comprises a contact assembly 142, a coolant block 144, a rotary union shaft 146, a brass connector 148, and a rotary mounting face 150. Thrust bearings 152 may be mounted to the coolant block 144 and rotary union shaft 146 to allow for rotational movement. The thrust bearings 152 may be secured in place by a jam nut. The use of the rotary coolant assembly reduces the amount of stress to the supply conduit, resulting in extended life of the supply conduit based on minimization/elimination of repetitive torsional movements to the supply conduit.

Dynamic sealers may be mounted between the rotary shaft and coolant block. The dynamic sealers enable the coolant and inert gas to flow through the rotary coolant assembly during rotation while preventing leakage of the coolant and inert gas thus enabling cooling and gas shielding to the consumable suite. The flow of current through the rotary coolant assembly may be provided by two or more copper contacts (semi ring contacts) 154 wrapping around the rotary coolant assembly 140 which enable the current to flow to the conductive tube assembly through contact assembly 142 as shown in FIG. 3. The semi ring contacts 154 may be secured in place by external ring clips and soldered to the contact assembly 142. This creates an alternate connection during the rotation while welding. This also creates an alternate cooling during the rotation of the or the rotary welding assembly.

As shown in FIG. 4, the rotary coolant assembly may include a plurality of passageways allowing for the passage of coolant, electrode wire, and inert gas through the rotary coolant assembly while providing for continuous rotation of the rotary welding assembly. The rotary coolant assembly may include a plurality of intersecting channels 156 which form passageways allowing the coolant to travel through the rotary coolant assembly to the conductive tube assembly during rotation of the rotary coolant assembly. The plurality of intersecting channels 156 may together form a flow path which allows the coolant to continuously flow through the rotary welding assembly. Coolant enters the rotary coolant assembly 140 from the supply conduit 120 via the coolant input 160. After flowing through the rotary coolant assembly 140 the coolant exits through the coolant output 162 and enters the conductive tube assembly 170 and flows through the chiller. After flowing through the conductive tube assembly 170, the coolant flows back into the rotary coolant assembly 140 via the coolant return 164 and exits the rotary coolant assembly through a coolant exhaust. The rotary coolant assembly also includes a centrally located passageway 158 along the central axis of the rotary coolant tool. The centrally located passageway 158 allows for the electrode wire and inert gas to be supplied through the rotary coolant assembly 140 to the conductive tube assembly and supplied to the consumable suite for the welding process.

Transfer of the electrical current through the rotary coolant assembly 140 is provided via the contact assembly 142 and one or more conductive elements in the rotary coolant assembly. An electrical current is first supplied to the rotary coolant assembly 140 from the supply conduit 120. The electrical current is then transferred to the contact assembly 142 via one or more conductive elements such as a conductive wire, conductive strip or conductive component. The contact assembly 142 provides for transfer of electrical current through the rotary coolant assembly while providing for continuous rotation of the rotary welding assembly. The electrical current is then supplied from the contact assembly 142 to the conductive tube assembly 170 via one or more conductive elements such as a conductive wire, conductive strip or conductive component.

Figure 5:
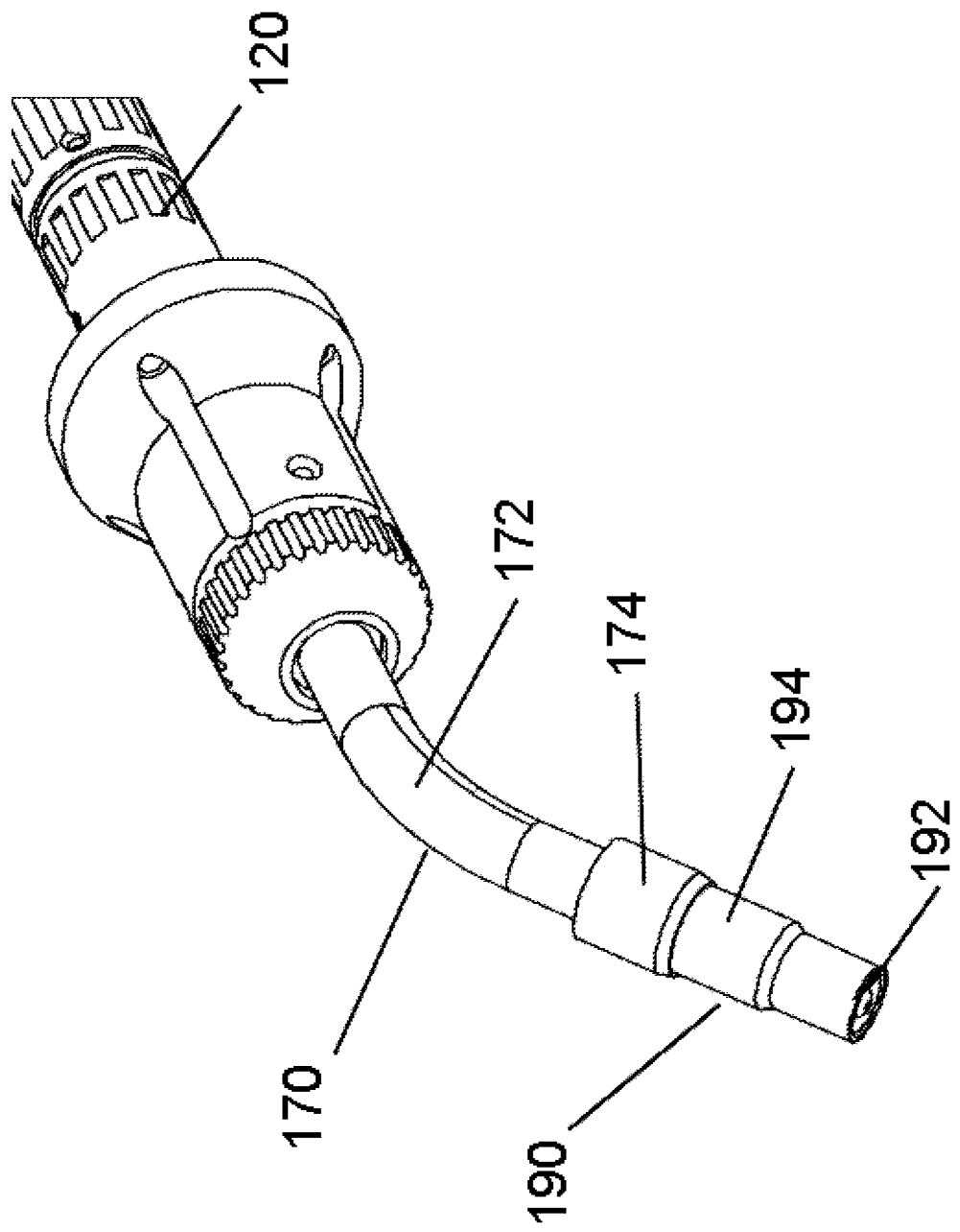
FIG. 5 is a depiction of a conductive tube assembly as connected to the rotary coolant assembly of a MIG rotary welding torch in accordance with the present disclosure.

The conductive tube assembly 170 connects the rotary coolant assembly 140 to the consumable suite 190. The conductive tube assembly 170 may be comprised of a conductive tube 172 and chiller 174. A depiction of a conductive tube assembly 170 as connected to the rotary coolant assembly 140 is shown in FIG. 5. The conductive tube assembly 170, together with the consumable suite 190 and chiller 174 may be replaceable either individually or as an entire unit. The coolant, electrode wire, and inert gas are supplied through the conductive tube 172 to the chiller 174 and consumable suite via two or more passages in the conductive tube 172. The coolant enters the coolant tube assembly from the rotary coolant assembly through a coolant inlet, circulates through the conductive tube assembly thereby making thermal contact with the chiller, and exits the conductive tube assembly via a coolant outlet and enters the rotary coolant assembly. The inert gas and the electrode wire may be supplied to the consumable suite through the conductive tube assembly in single passageway or separate passageways extending from the rotary coolant assembly. In a preferred embodiment of the present disclosure, the inert gas and the electrode wire are supplied to the consumable suite via a single passageway from the rotary coolant assembly through the conductive tube.

The conductive tube 172 may be a comprised of one or more pieces. The conductive tube may be formed from a metallic compound such as copper or brass. The conductive tube assembly may be drilled with intersecting channels, to allow the coolant to travel through the conductive tube to the front end of the chiller 174 where the chiller is mounted to the conductive tube. The conductive tube assembly may be mounted to the welding torch thru the brass connector of the rotary coolant assembly. The conductive tube assembly 170 may be located with one or more dowel pins/coolant fittings mounted at the brass connector of the rotary coolant assembly. Once connected, the conductive tube assembly 170 may be secured to the rotary coolant assembly with the front lock cap which may be threadably coupled to the front of the protective housing.

The consumable suite 190 generally comprises a contact tip 192 and a gas diffuser/nozzle 194. The consumable suite may also include an electrode wire liner which protects the electrode wire within the rotary welding assembly. Prior to entering and becoming exposed through the contact tip, the electrode wire travels through the electrode wire liner. The electrode wire liner prevents buckling of the electrode wire and helps to maintain an uninterrupted electrode wire feed. Within the consumable suite 190, the exposed electrode wire is introduced to an electrical current which heats the electrode wire causing the electrode wire to melt. The electrical current is supplied through the conductive tube via one or more conductive elements to the contact tip. The one or more conductive elements may be one or more of a conductive wire, a conductive strip or a conductive component.

Figure 6:
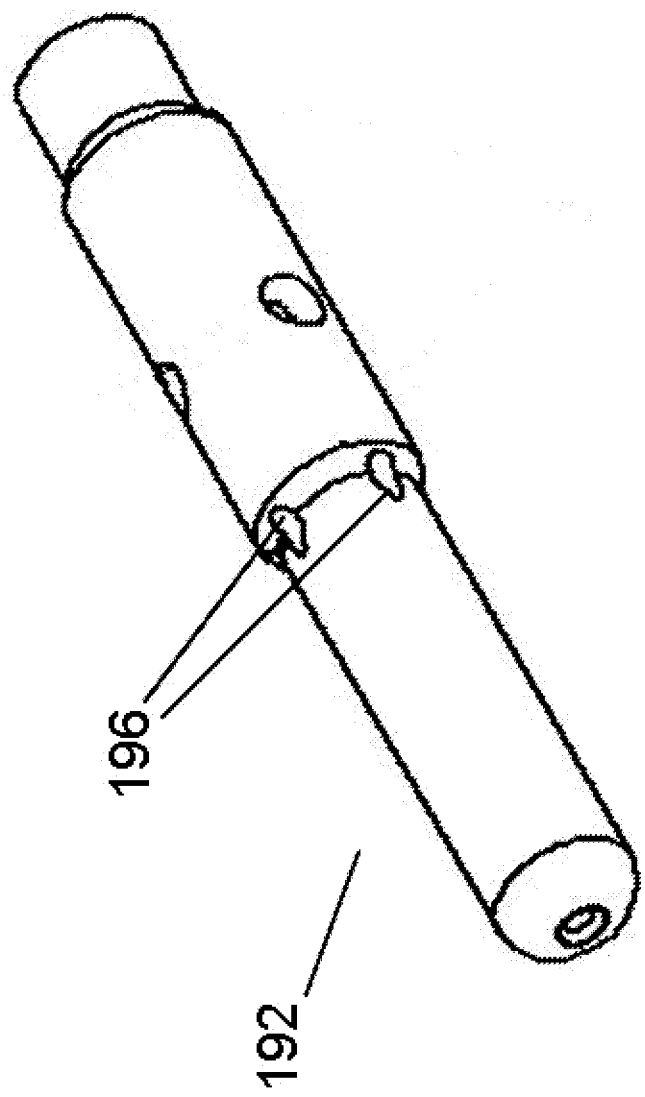
FIG. 6 is a depiction of a contact tip of a MIG rotary welding torch in accordance with the present disclosure.

During operation of the welding torch, the electrode wire is fed through the conductive tube assembly 170 to the contact tip 192 within the consumable suite 190. As the electrode wire passes through the contact tip electrical current is supplied to the contact tip and transmitted to the electrode wire within the consumable suite. The contact tip 192 may be made of a metallic material such as copper. A depiction of a contact tip in accordance with the present disclosure is shown in FIG. 6. The contact tip may comprise one or more debris exhaust holes 196. The one or more debris exhaust holes 196 may aid in removal of powder formed from friction between wire filler/liner and wire filler/contact tip during the welding process. The presence of the exhaust holes may provide an exit through which the debris may escape during air blow operation. The contact may also include one or more gas shielding holes 198. The gas shielding holes 198 may aid in distribution of the inert gas within the consumable suite.

The gas diffuser/nozzle 194 may be a cylindrical member which fits over the contact tip 192 to form the consumable suite 190. The gas diffuser/nozzle 194 aids in directing the shielding gas into the welding zone to prevent reaction of the molten electrode wire with oxygen and/or nitrogen in the atmosphere.

The conductive tube assembly 170 may further comprise an insulator which is disposed proximate to the chiller. The insulator aids in maintaining the chiller temperature during operation of the welding torch. The insulator may be comprised of one or more insulating materials which are suitable for a welding environment.

Figure 7:
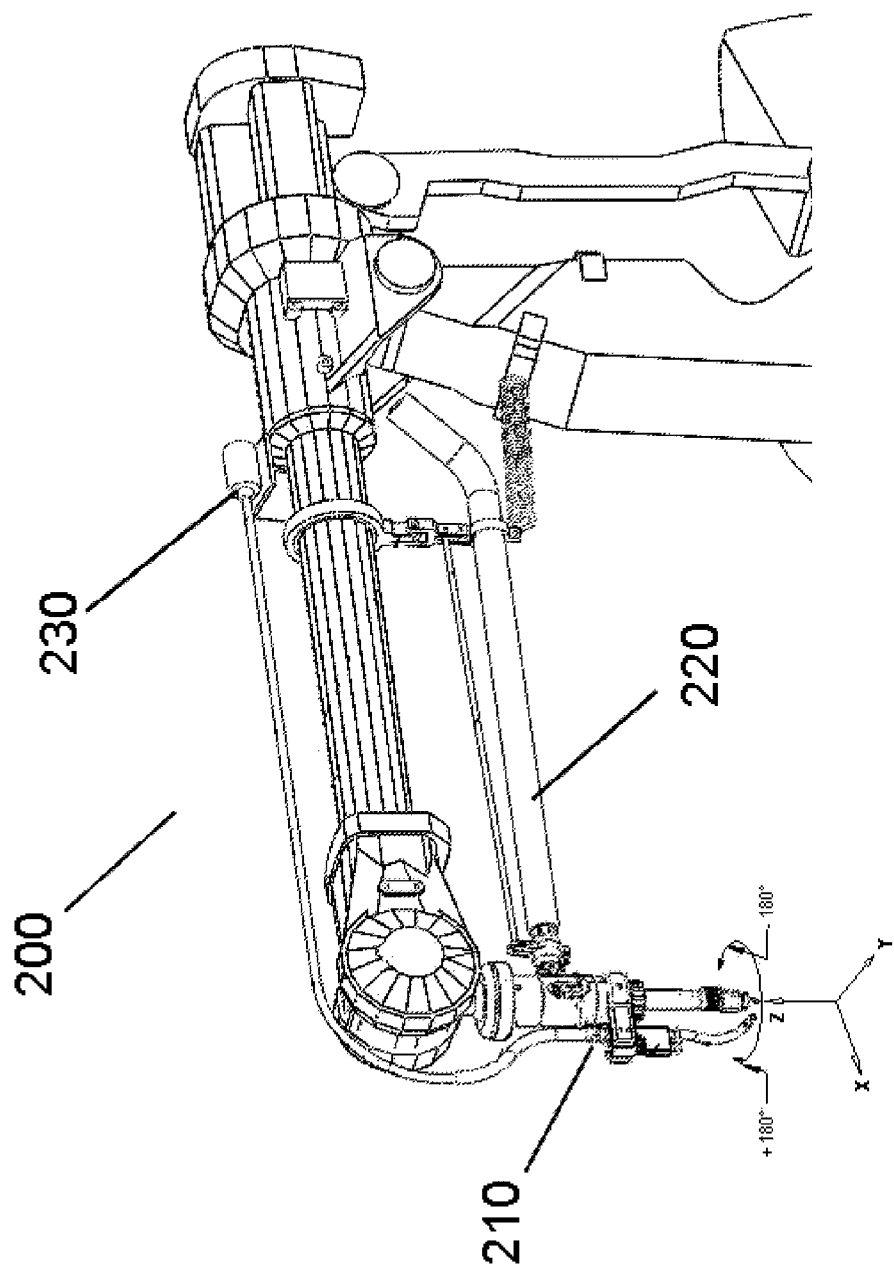
FIG. 7, is a depiction of a TIG rotary welding torch in accordance with the present disclosure.

In a second embodiment in accordance with the present disclosure, there is provides a TIG robotic welding torch 200. The TIG welding torch generally comprises a rotary welding assembly 210, a supply conduit 220, a source of filler wire 230, a source of inert gas and a power source. A depiction of a TIG welding torch in accordance with the present disclosure is depicted in FIG. 7. When utilizing a coolant, the welding torch will also require a coolant source for providing cooled water or air to the rotary welding assembly.

Figure 8:
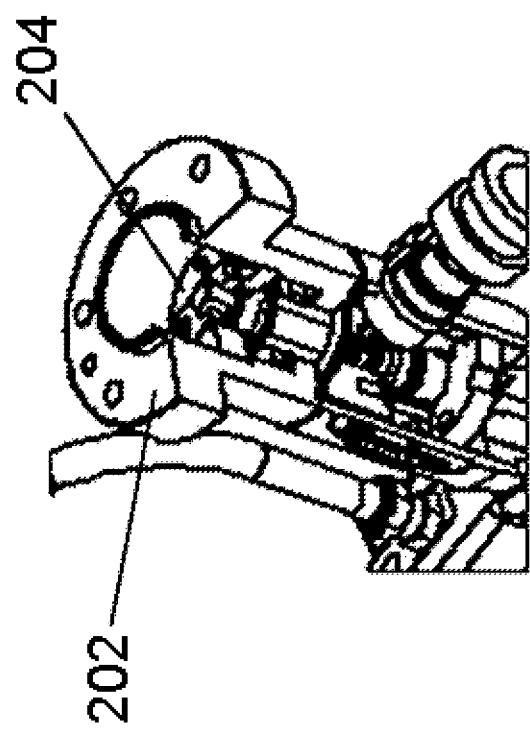
FIG. 8, is a depiction of the housing flange and rotary joint assembly of a TIG rotary welding torch in accordance with the present disclosure.
Figure 9:
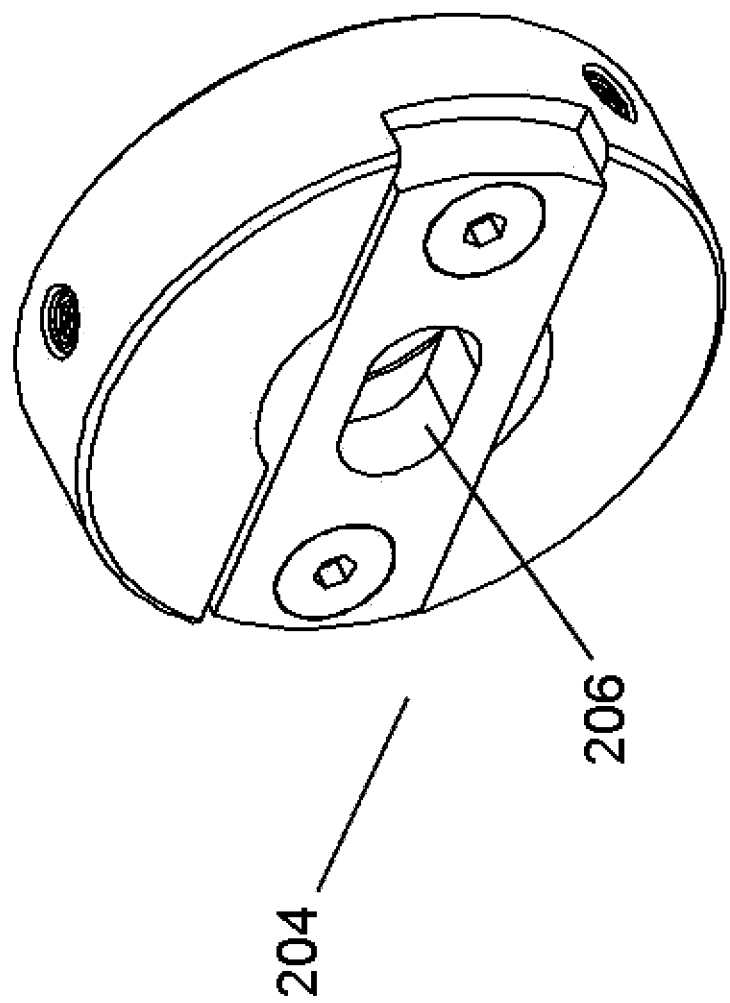
FIG. 9, is a depiction of the rotary joint assembly of a TIG rotary welding torch in accordance with the present disclosure.
Figure 10:
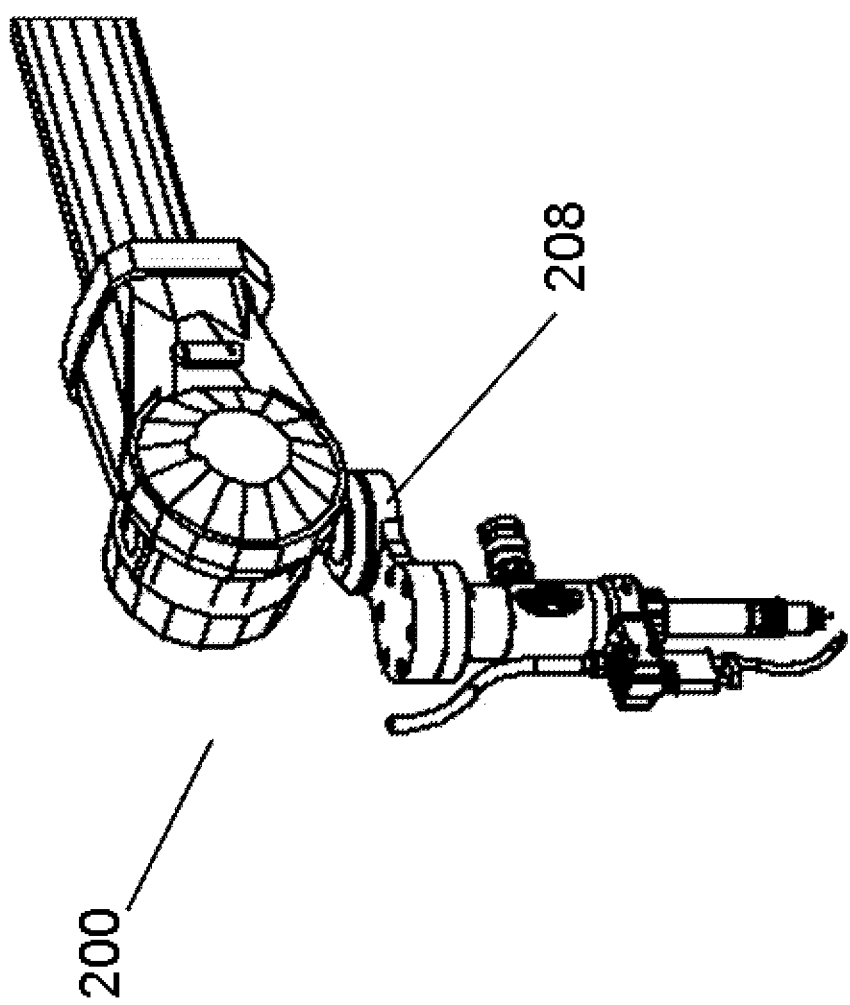
FIG. 10, is a depiction of a TIG rotary welding torch in accordance with the present disclosure having an arm mounted configuration.

The TIG welding torch may be fastened to the robotic unit via a housing flange which mounts directly to the front robotic flange. The rotary movement of the rotary welding assembly may be realized from the housing flange 202, through a rotary joint assembly 204 as shown in FIG. 8. A depiction of the rotary joint assembly 204 is depicted in FIG. 9. The rotary joint assembly 204 engages the rotary shaft via a slot 206 and is secured in place with fasteners to the housing flange. For independent rotary motion, the rotary shaft may engage a hollow electromotor mounted inside the housing flange using the same rotary joint assembly. This may also apply to an rotary welding torch with an arm mounted configuration 208, as shown in FIG. 10.

Figure 11:
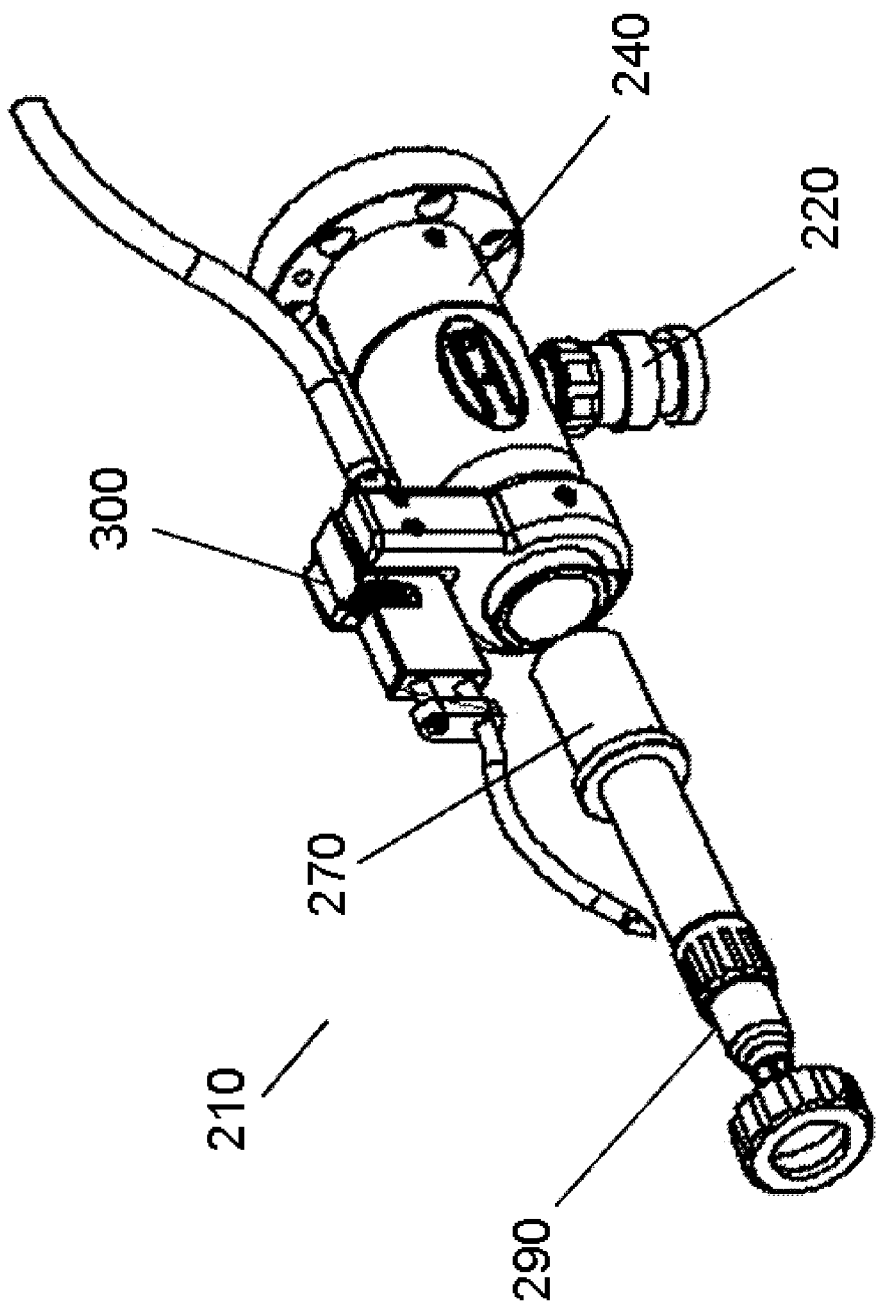
FIG. 11, is a depiction of a rotary weld assembly of a TIG rotary welding torch in accordance with the present disclosure.
Figure 12:
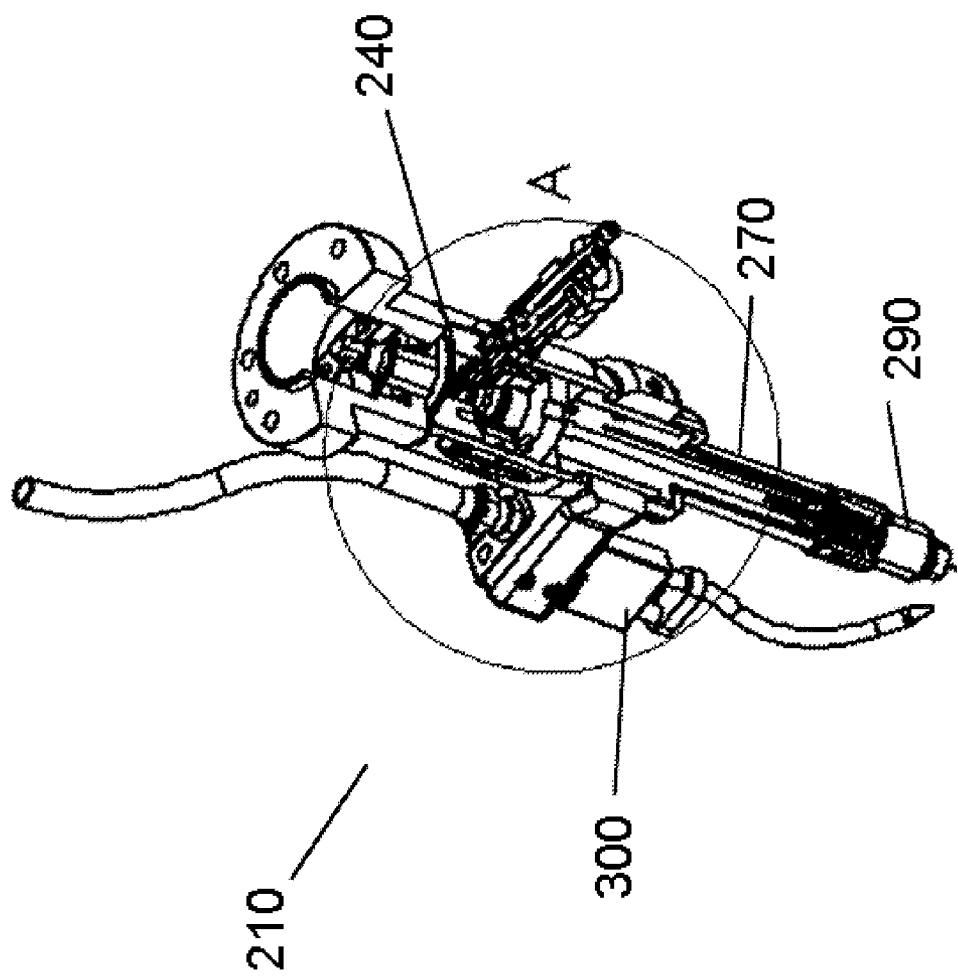
FIG. 12, is a cut-away view of the rotary weld assembly of FIG. 11.
Figure 13:
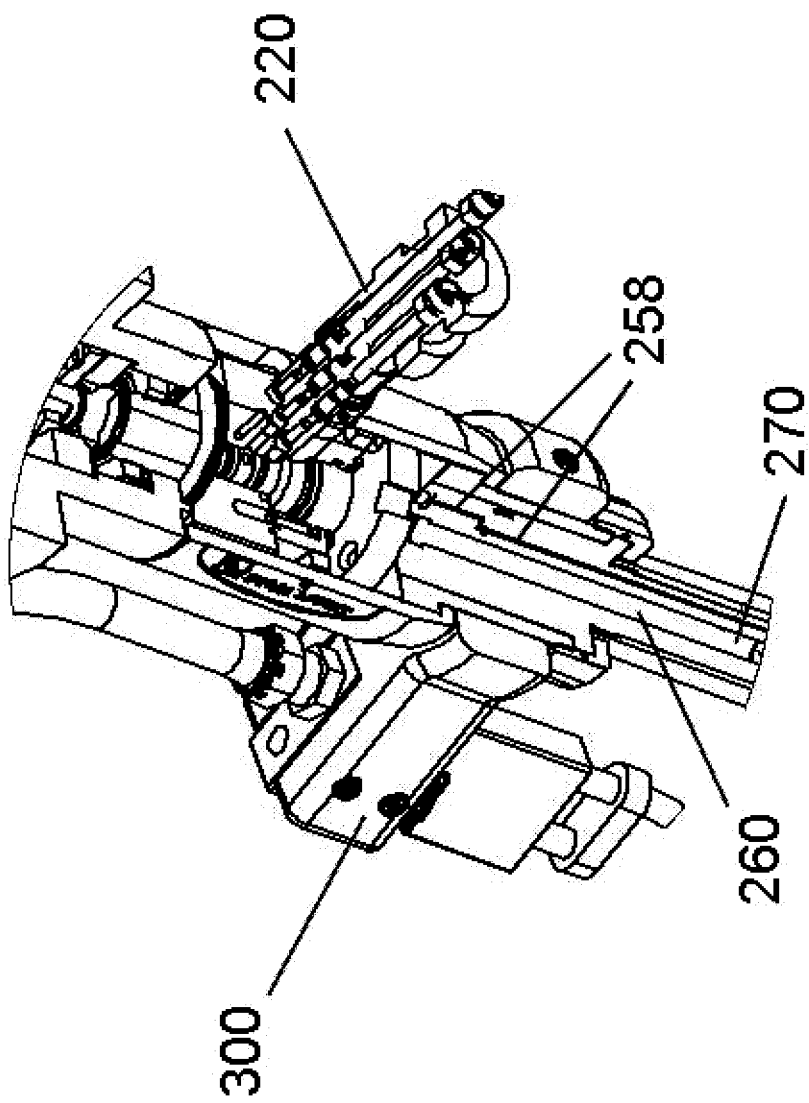
FIG. 13, is a close up view of the rotary weld assembly of FIG. 12.

The rotary weld assembly comprises a rotary coolant assembly 240, a conductive tube assembly 270, a consumable suite 290, and at least one wire guide assembly 300 as shown in FIG. 11, FIG. 12, and FIG. 13. FIG. 12 shows a cut-away view of the rotary weld assembly 210 in accordance with the present disclosure. FIG. 13 shows a close up of the cut-away view of FIG. 12. The rotary coolant assembly 240 is designed to receive inert gas, coolant and an electrical current from the supply conduit 220 and supply the inert gas, coolant and electrical current to the conductive tube assembly 270 while providing for 360 degree clockwise or counterclockwise rotation of the rotary welding assembly. The conductive tube assembly 270 receives the inert gas, coolant and an electrical current from the rotary coolant assembly 240 and transfers the inert gas, coolant and an electrical current to the consumable suite 290 for use in the welding process. The wire guide assembly 300 provides a filler wire to the consumable suite 290 during the welding process.

Figure 14:
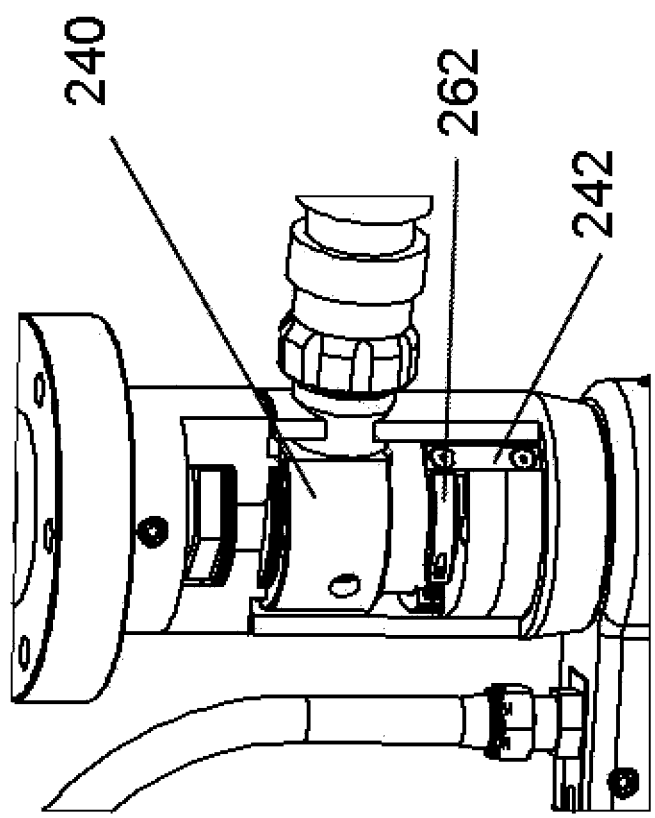
FIG. 14, is a depiction of the rotary coolant assembly of a TIG rotary welding torch in accordance with the present disclosure.
Figure 15:
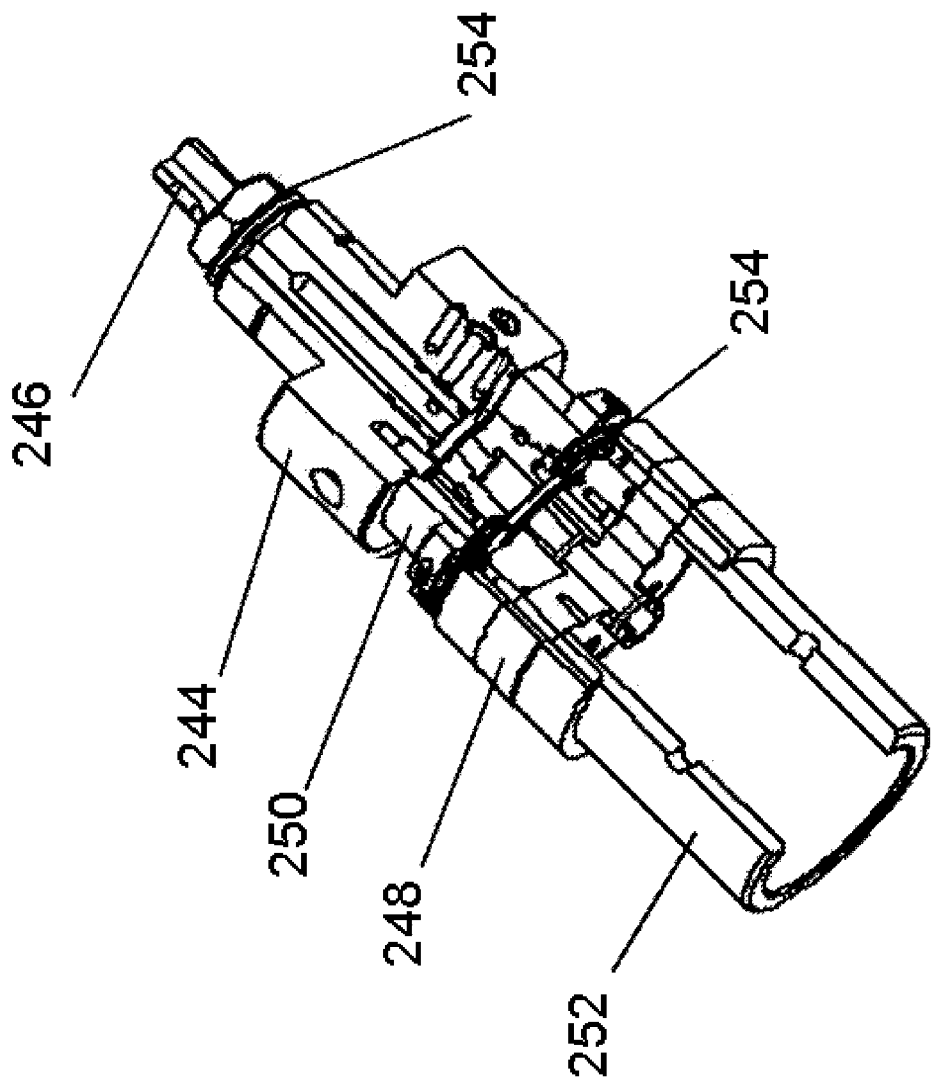
FIG. 15, shows a cut-away view of the coolant assembly of FIG. 14.
Figure 16:
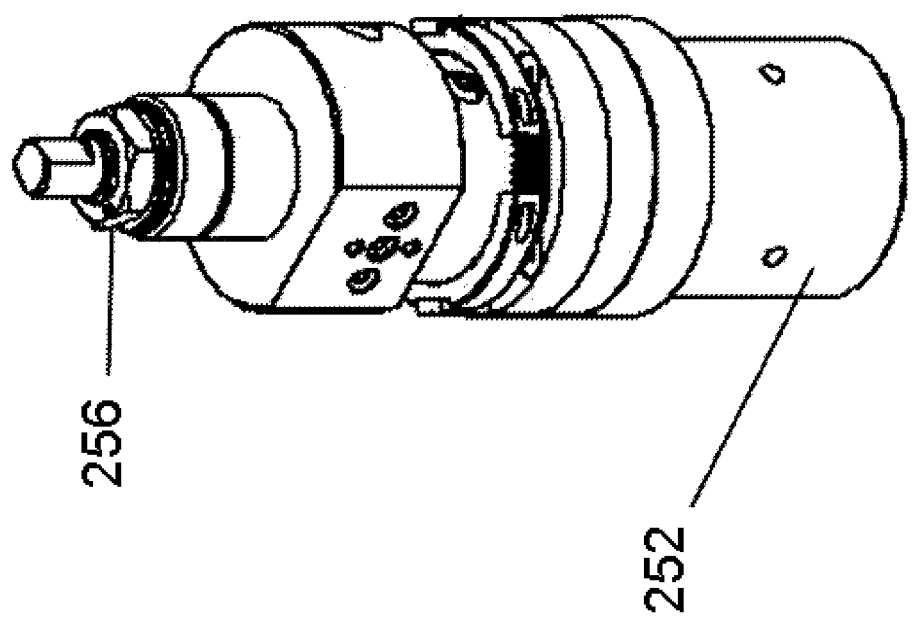
FIG. 16, is a depiction of the rotary coolant assembly of a TIG rotary welding torch in accordance with the present disclosure as secured with a jam nut.

Shown in FIG. 14 is a view of the rotary coolant assembly 240 in accordance with the present disclosure. FIG. 15, shows a cut-away view of the rotary coolant assembly of FIG. 14. The rotary coolant assembly 240 may be comprised of a contact assembly 242, a coolant block 244, a rotary union shaft 246, a rotary mounting face 248, a manifold assembly 250, and a wire guide collar holder 252. Thrust bearings 254 may be mounted to the manifold assembly 250 to allow rotational movement and may be secured in place by a jam nut 256 as shown in FIG. 16. The use of the rotary coolant assembly 240 reduces the amount of stress to the supply conduit, resulting in extended life of the supply conduit based on minimization/elimination of repetitive torsional movements.

The supply conduit 220 is connected to the rotary coolant assembly 240 via the manifold assembly 250. Dynamic sealers mounted between rotary shaft 246 and manifold assembly 250 enable the coolant and inert gas to flow through the rotary coolant assembly during the rotation while preventing leakage of the coolant and inert gas and enabling cooling and gas shielding to the consumable suite.

As shown in FIGS. 12, 13, and 15, the rotary coolant assembly may include a plurality of passageways allowing for the passage of coolant and inert gas through the rotary coolant assembly while providing for 360 degree clockwise or counterclockwise rotation of the rotary welding assembly. The rotary coolant assembly may include a plurality of intersecting channels 258 which form passageways allowing the coolant to travel through the rotary coolant assembly 240 to the conductive tube assembly 270 during rotation of the rotary coolant assembly 240. The plurality of intersecting channels 258 may together form a flow path which allows the coolant to continuously flow through the rotary welding assembly 210. The rotary coolant assembly 240 also includes a centrally located passageway 260 along the central axis of the rotary coolant assembly. The centrally located passageway 260 allows for the inert gas to be supplied through the rotary coolant assembly 240 to the conductive tube assembly 270 and supplied to the consumable suite 290 for the welding process.

Transfer of the electrical current through the rotary coolant assembly is provided via the contact assembly 242 and one or more conductive elements in the rotary coolant assembly 240. An electrical current is first supplied to the rotary coolant assembly from the supply conduit. The electrical current is then transferred to the contact assembly 242 via one or more conductive elements such as a conductive wire, conductive strip or conductive component. The contact assembly 242 provides for transfer of electrical current through the rotary coolant assembly while providing for rotation of the rotary welding assembly. The electrical current is then supplied from the contact assembly 242 to the conductive tube assembly 270 via one or more conductive elements such as a conductive wire, conductive strip or conductive component.

The flow of current through the rotary coolant assembly may be provided by two or more copper contacts (semi ring contacts) 262 wrapping around the rotary coolant assembly which enable the current to flow to the conductive tube assembly 270 throughout the contact assembly as shown in FIG. 14. The semi ring contacts 262 may be secured in place by external ring clips and soldered to the copper strip contacts. This creates an alternate connection during the rotation of the rotary welding assembly 210. The design of the rotary coolant assembly 240 provides for alternate cooling during the rotation of the welding torch in the welding process resulting in low operating temperatures, to the front end consumables during the welding process.

Figure 17:
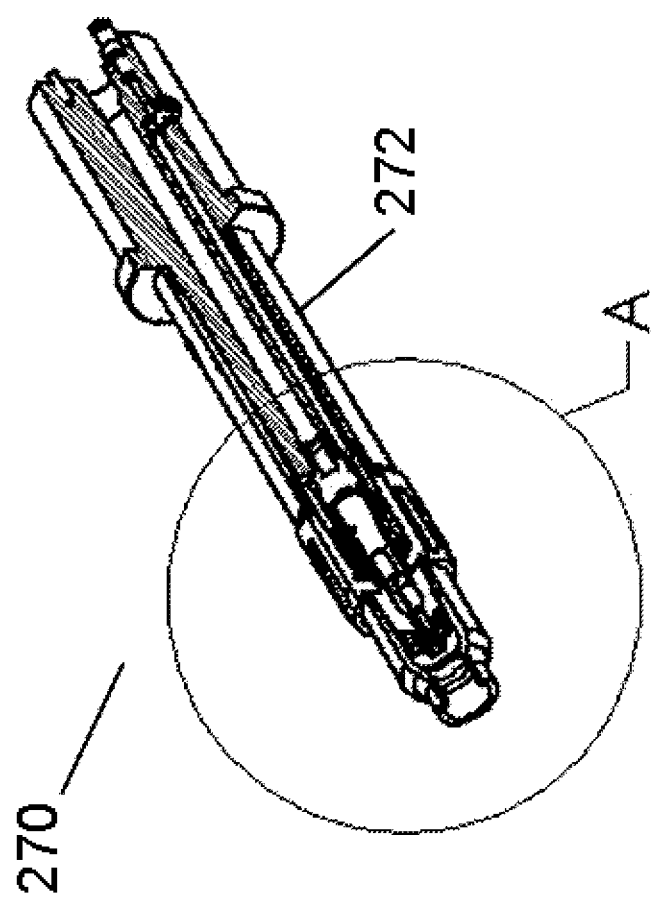
FIG. 17, is a depiction of a conductive tube assembly as connected to the rotary coolant assembly of a TIG rotary welding torch in accordance with the present disclosure.

The conductive tube assembly 270 connects the rotary coolant assembly 240 to the consumable suite 290. The conductive tube assembly 270 may be comprised of the conductive tube 272 and chiller components 274. A depiction of a conductive tube assembly as connected to the rotary coolant assembly is shown in FIG. 17. The conductive tube assembly, together with the consumable suite 290 and chiller components 274 may be replaceable either individually or as an entire unit. The coolant and inert gas may be supplied through the conductive tube assembly 270 to the chiller and consumable suite via two or more passages in the conductive tube. The coolant enters the coolant tube assembly from the rotary coolant assembly 240 through a coolant inlet, circulates through the conductive tube assembly 270 thereby making thermal contact with the chiller components 274, and exits the conductive tube assembly 270 via a coolant outlet and enters the rotary coolant assembly 240. The inert gas may be supplied to the consumable suite through a center hole of the conductive tube assembly extending from the rotary coolant assembly to the consumable suite.

The conductive tube assembly 270 may be a comprised of one or more pieces. The conductive tube 272 may be formed from a metallic compound such as copper or brass. The conductive tube assembly may be drilled with intersecting channels, to allow the coolant to travel through the conductive tube to the front end of the chiller where the chiller is mounted to the conductive tube. The chiller may be mounted to the conductive via soldering. The conductive tube assembly may be mounted to the welding torch thru the wire guide holder cavity. The conductive tube assembly may be located with one or more dowel pins to match the rotary mounting face coolant holes with the male fittings. Once connected, the conductive tube assembly may be secured in place with a conductive tube cap lock which positioned around the conductive tube assembly and is threadably coupled to the wire guide holder.

The conductive tube assembly may further comprise an insulator which is disposed proximate to the chiller. The insulator aids in electrically insulating the conductive tube assembly from contacting metallic objects that may come into contact with the rotary welding torch during the welding process. The insulator may be comprised of one or more electrically insulating materials which are suitable for a welding environment. The insulator may also aid in positioning and securing the contact tip within the consumable suite. The insulator may be threadably coupled to the conductive tube assembly.

Figure 18:
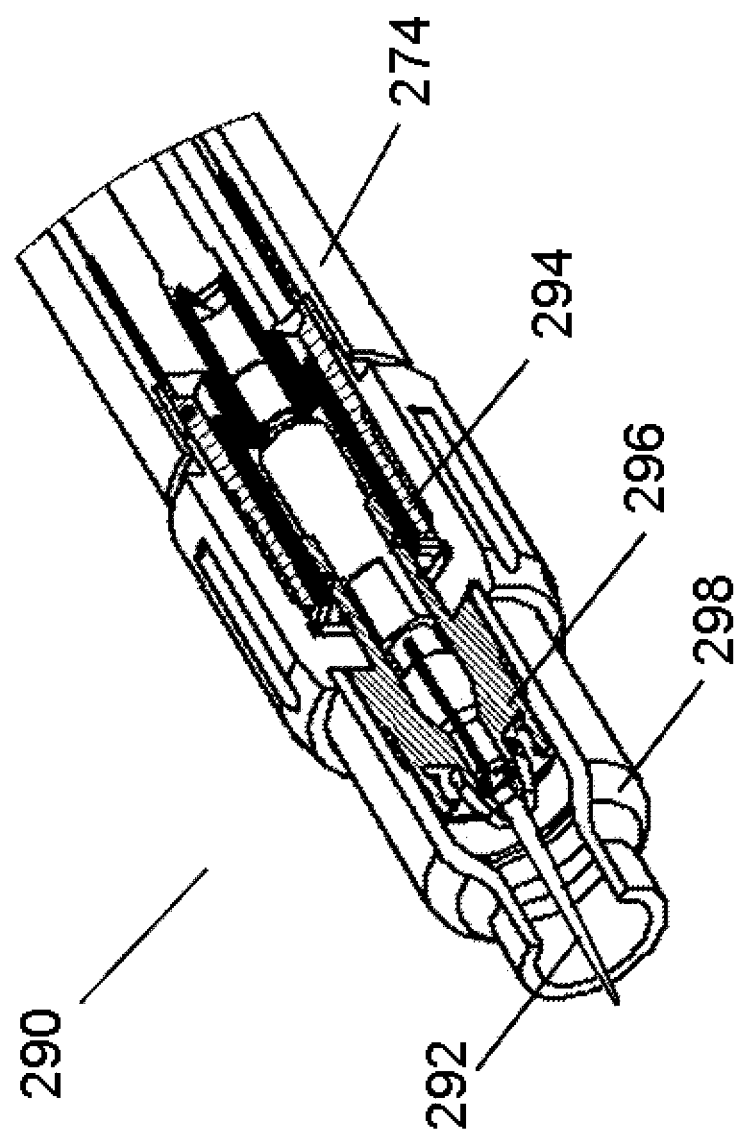
FIG. 18, is a depiction of the consumable suite of a TIG rotary welding torch in accordance with the present disclosure.

The consumable suite 290 generally comprises a contact tip 292, a contact tip holder 294, a gas diffuser 296, and a nozzle 298 as shown in FIG. 18. As previously discussed, the contact tip 292 may be comprised of tungsten. The contact tip 292 may be adjustable with respect to the welding torch thereby providing for variable stick out length of the contact tip. The contact tip may be secured by tightening of the insulator to the conductive tube assembly which causes the contact tip holder to tighten about the contact tip thus securing the contact tip in place within the contact tip holder. In one embodiment of the present disclosure, as the insulator 295 is tightened against the conductive tube assembly, the slots at the front of the contact tip 292 holder are squeezed together thereby securing the contact tip in place. The contact tip may therefore be adjusted by unthreading the insulator 295 and repositioning the stick out length of the contact tip 292 within the contact tip holder 294. Electrical current is supplied to the tungsten contact tip from the conductive tube assembly 270 via the contact tip holder 294. The electrical current supplied to the contact tip 292 causes an electrical arc to be struck between the contact tip 292 and the workpiece during operation of the rotary welding torch. The electrical arc may cause at least a portion of the workpiece and/or filler wire to melt thereby creating a weld pool on the workpiece.

The nozzle 298 may be a cylindrical member which fits over the contact tip 292 and gas diffuser 296 to form the consumable suite. The nozzle 298 should be made of a material able to withstand the temperatures of the welding process. A suitable material for the nozzle is a ceramic material. The nozzle aids in directing the shielding gas into the welding zone to prevent reaction of the molten electrode wire with oxygen and/or nitrogen in the atmosphere.

Figure 19:
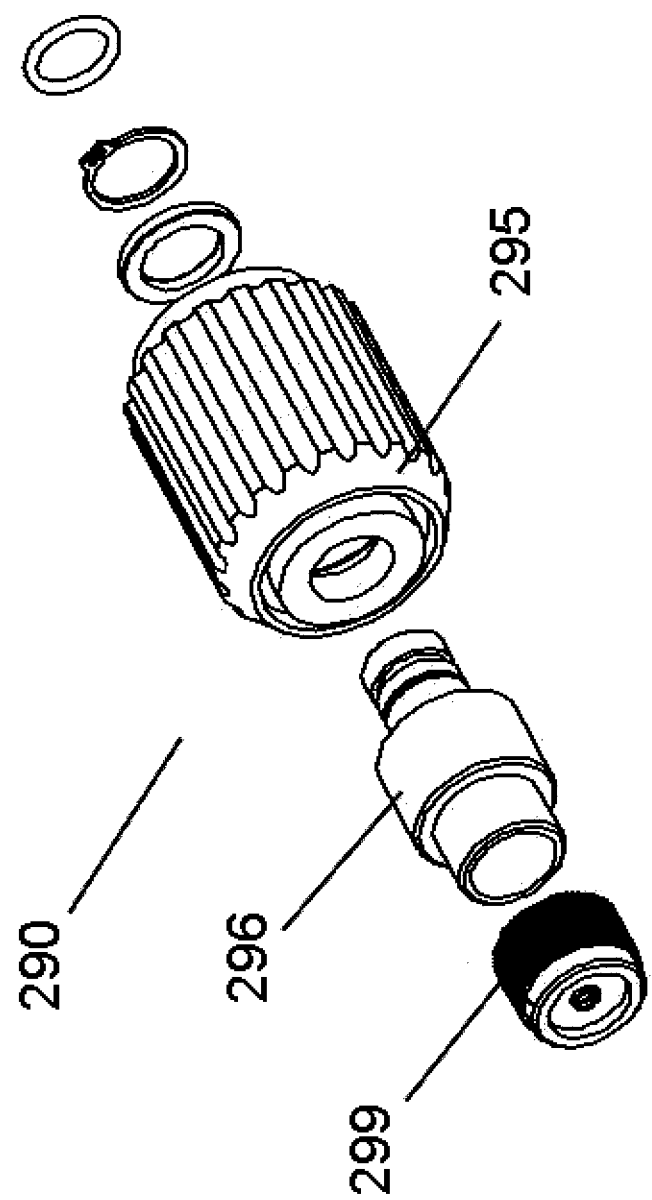
FIG. 19, is a depiction of an exploded view of the consumable suite of a TIG rotary welding torch in accordance with the present disclosure.

The consumable suite may additionally include a gas lens 299 or screen which acts to further diffuse and distribute the gas in the welding area. The gas lens 299 may be coupled to the gas diffuser 296 and situated between the gas diffuser and the nozzle within the consumable suite. The gas lens 299 may be threadably coupled to the gas diffuser 296. The gas lens may be replaceable as a single component thus not requiring replacement of the entire consumable suite. A depiction of a gas lens is shown in the exploded view of the consumable suite in FIG. 19.

Figure 20:
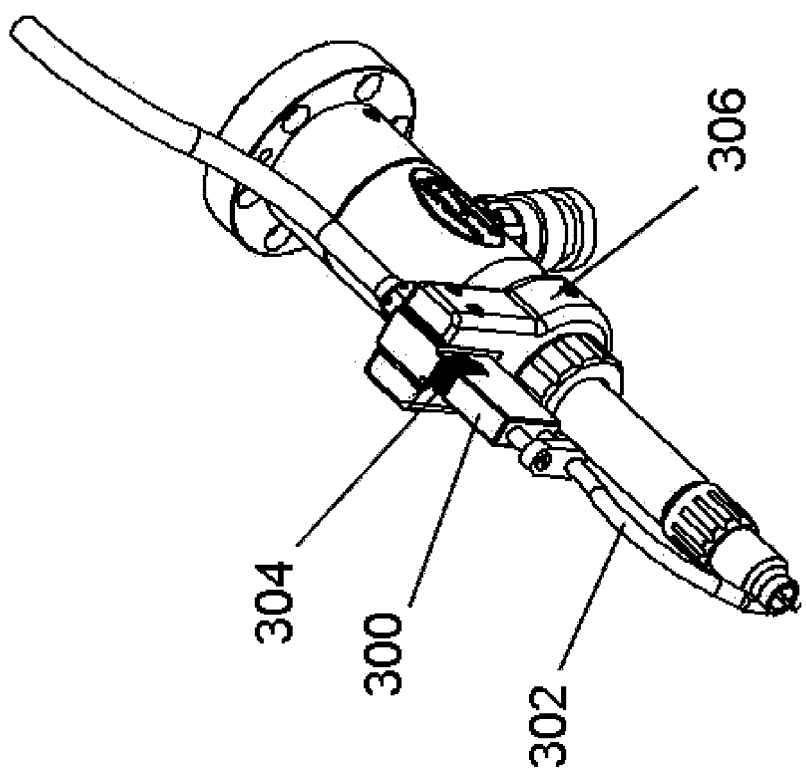
FIG. 20 is a depiction of a TIG rotary welding torch in accordance with the present disclosure having one wire guide assembly.
Figure 21:
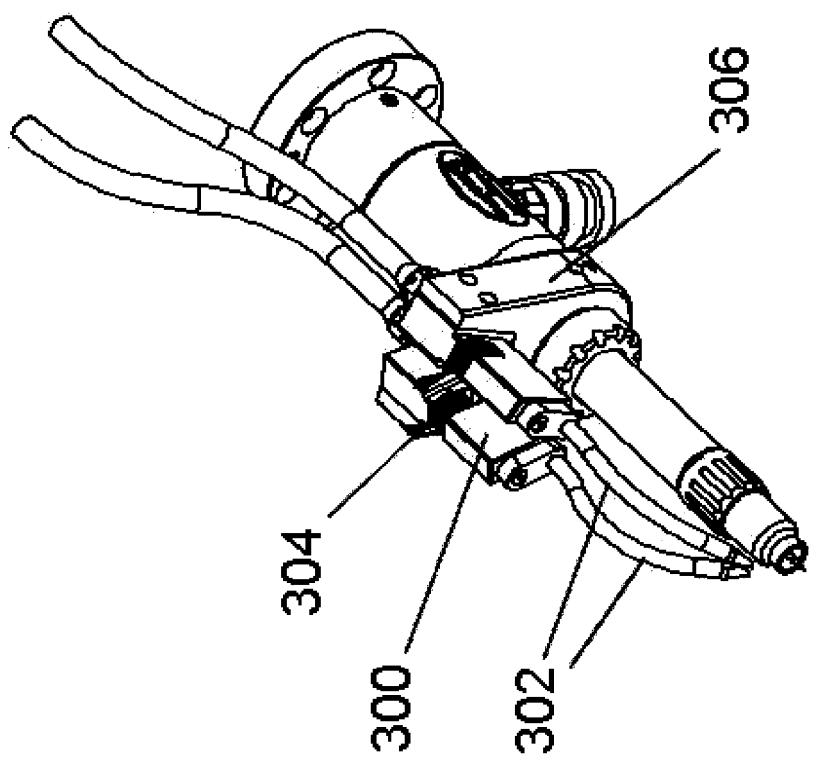
FIG. 21 is a depiction of a TIG rotary welding torch in accordance with the present disclosure having two wire guide assemblies.

The rotary welding assembly may comprise one or more wire guide assemblies 300. Depicted in FIG. 20, is a rotary welding assembly having one wire guide assembly 300 and depicted in FIG. 21 is a rotary welding assembly having two wire guide assemblies 300. Each wire guide assembly 300 may be comprised of a wire guide support 302 and a tool center point adjusting suite 304. The one or more wire guide assemblies each comprise a wire guide collar 306 may be secured in place by fasteners with the wire guide collar holder of the rotary coolant assembly.

Filler wire may be supplied to the wire guide assembly 300 from the filler wire source 230 via a filler wire liner. The filler wire liner prevents buckling of the electrode wire and helps to maintain an uninterrupted filler wire feed. The filler wire is delivered to the weld pool via the wire guide assembly. The one or more wire guide assemblies 300 provide an adjustable filler wire height which enables a variable contact tip stick out lengths. The adjustability of the filler wire filler is in respect to the tool center point of the contact tip. The height of the filler wire can be varied depending on the desired welding parameters. The adjustability of the filler wire also provides the ability to perform a quick job change in the welding cell. The position of the wire to the tool center point is realized through the rotational movement of a knob resulting in the translative movement of the tool center point adjusting suite as depicted in FIGS. 20 and 21.

While there have been described what are believed to be the preferred embodiments of the present disclosure, those skilled in the art will recognize that other and further changes and modifications may be made thereto without departing from the spirit of the disclosure, and it is intended to claim all such changes and modifications as fall within the true scope of the disclosure.

The invention claimed is:

1. A rotary welding torch comprising:
 a supply conduit adapted to provide electrode wire, inert gas, coolant and electrical current;
 a rotary coolant assembly having a central axis and including a contact assembly, a coolant block, and a connector assembly, said coolant block and said connector assembly rotatably connected to one another for relative rotation about said central axis, said coolant block of said rotary coolant assembly connected to said supply conduit, whereby said rotary coolant assembly receives said electrode wire, inert gas, coolant, and electrical current from said supply conduit, said coolant block and said connector assembly defining coolant passageways communicating with one another regardless of the relative rotational orientation of said coolant block and said connector assembly, whereby coolant can flow through said coolant passageways regardless of the relative rotational orientation of said coolant block and said connector assembly, said coolant block and said connector assembly further defining wire/gas passageways communicating with one another regardless of the relative rotational orientation of said coolant block and said connector assembly, said wire/gas passageways axially aligned with one another and coaxial with said central axis, said contact assembly including semi ring contacts; and
 a conductive tube assembly connected to said connector assembly of said rotary coolant assembly, whereby said conductive tube assembly rotates with said connector assembly with respect to said coolant block, whereby the flow of current through the rotary coolant assembly is provided by said semi ring contacts of said contact assembly which enable the current to flow to the conductive tube assembly through the contact assembly, said conductive tube assembly receiving said electrode wire, inert gas, coolant, and electrical current from said connector assembly of said rotary coolant assembly.

2. The rotary welding torch according to claim 1, wherein said relative rotation about said central axis is endless.

3. The rotary welding torch according to claim 1, wherein said connector assembly of said rotary coolant assembly includes a contact assembly which supplies current from said rotary coolant assembly to said conductive tube assembly.

\* \* \* \* \*